June 10, 1941.   W. A. CARLSON   2,244,939
VACUUM CONNECTION
Filed May 9, 1940

Inventor:
Walter A. Carlson.
By Arthur K. Wylie
Attorney.

Patented June 10, 1941

2,244,939

UNITED STATES PATENT OFFICE 2,244,939

VACUUM CONNECTION

Walter A. Carlson, Minneapolis, Minn., assignor to General Mills, Inc., a corporation of Delaware Application May 9, 1940, Serial No. 334,221

3 Claims. (Cl. 285—2)

In apparatus for treating various materials under a high vacuum such as of the order of 100 to 200 microns pressure or less, it is often necessary to make connection between a metal tube and a glass tube, for example, where the length of one or the other of these tubes varies with respect to the other so that a considerable degree of accommodation in the connection is required.

An object of this invention is the provision of means for connecting two substantially aligned tubes or parts of apparatus including means for accommodating differences in length of tubes.

Another object is the provision in such a connection of means for preventing the telescoping of one tube on the other due to air pressure, such means being readily adjustable to accommodate tubes of varying length as above pointed out.

Another object is to provide means of this character which are simple and easy to assemble and disassemble and yet efficient in holding a vacuum.

These and other objects, as will hereinafter appear, are accomplished by this invention which is fully described in the following specification and shown in the drawing in which.

Figure 1:
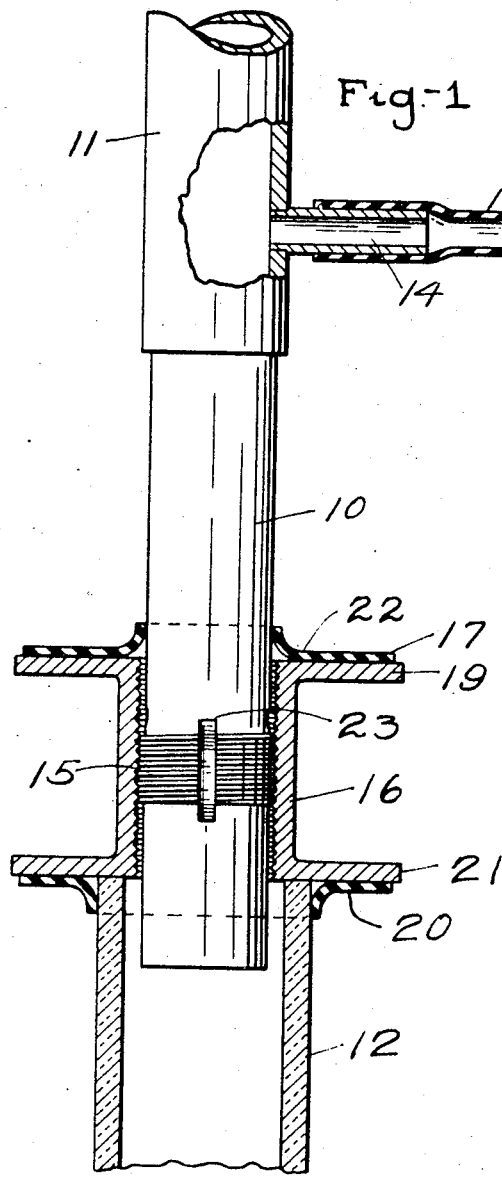
Figure 1 is a partial side elevation partly in section showing an embodiment of the invention.

The embodiment illustrated, shows apparatus for use in vaporizing and treating a solid preferably in crystalline form and consists of a tube 10 preferably of metal which has an upper section 11 through which the crystalline material is fed from a closed source, not shown. This material is to be fed to a glass tube 12, the purpose of the present invention being to get a simple and efficient connection between the tube 10 and the glass tube 12 when vacuum is applied thereto through a rubber tube 13 on a nipple 14 which causes the interior of the tube 10 to communicate with any suitable vacuum source, not shown.

The tube 10 is provided with a short series of screw threads 15 and on this is screwed a member 16 having complementary screw threads so that the member may be adjusted longitudinally in either direction along the tube 10 until it comes in contact with the upper end of the glass tube 12.

It is then necessary to get an air-tight seal between the top of the member 16 and the tube 10 on the one hand and between the bottom of this member and the tube 12 on the other. This I accomplished by means of a flat sheet rubber gasket 17 having a clean-out circular hole 17a therethrough by means of which the gasket may be slipped up over the tube 10. This gasket is coated on its lower surface with a heavy viscous fluid of low vapor pressure like castor oil 18 which effectually seals the space between the gasket and tube and prevents the passage of gas therethrough.

Figure 2:
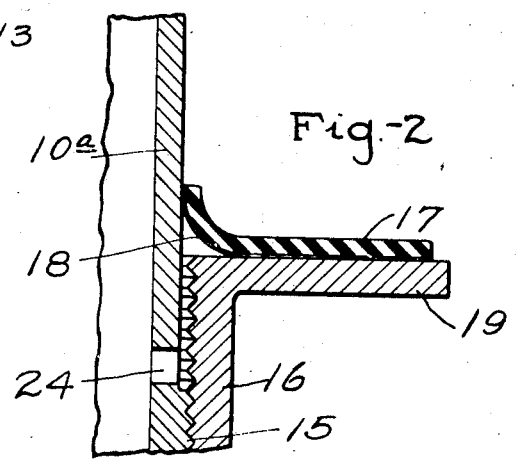
Fig. 2 is a partial enlarged section of a modification of the same.
Figure 3:
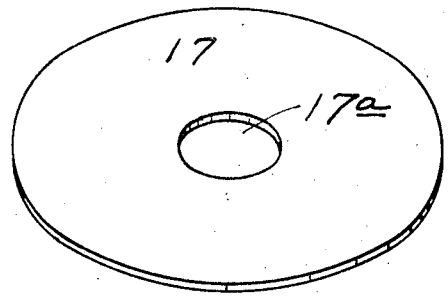
Fig. 3 is a perspective view of a gasket used as a seal.

This coating of castor oil, or the like, also extends between the gasket and upper surface of the flange 19 of the member 16 as shown in Fig. 2, thereby sealing the space between the gasket and this flange when the interior of the tubes is subjected to a vacuum, air pressure then pressing the gasket firmly against this flange. The hole 17a is made smaller than the tube 10 so that the material about this hole tends to hug the tube very tightly.

Similarly, a gasket 20 is provided with a larger circular opening which is made smaller than the tube 12 so that when placed thereover, as shown in Figure 1, it will hug the upper portion of this tube while the flat portion of this gasket is pressed against the flat surface of a flange 21 on the member 16. This gasket is likewise coated with castor oil, or the like, so as to effectually seal the space between the member and the glass tube.

In order to effectually evacuate the space 22 above the screw threads 15 and beneath the gasket 17, I have cut a small channel 23 as by means of a milling cutter. Otherwise the gas trapped in this space would have to slowly find its way through the screw threads.

In Fig. 2 I have shown a modification wherein a small hole 24 is drilled through the tube 10a above the screw threads 15.

Thus it will be seen that I have provided a very simple and efficient means for connecting a metal tube 10 to a glass tube which is adjustable for varying heights of these tubes and which prevents the telescoping of the tubes when the vacuum is applied thereto, since this thrust is taken through the screw member 16 and the metal tube 10. For this purpose, that portion of the tube 10 to which the gasket 17 is applied is rendered very smooth and is highly polished, the better to make the vacuum connection gas-tight. The same is true also of the upper portion of the glass tube 12.

For convenience only, the tube 10 is referred to herein as a metal tube and the tube 12 as a glass tube and it is not intended that the materials of these tubes shall be limited thereto. The upper tube may be of glass or the lower of metal, or both may be either glass or metal, and the invention will function with only small differences in structure. Thus screw threads might be formed on a glass tube 10 or the member 16 may be adjustably secured or fixed on the tube which it encloses in any desired manner. Also the tubes 10 and 12 may be merely tubular extensions of any hollow part to which the other tube is to be given a vacuum connection.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. In a vacuum connection of the class described, a tube having an external screw thread, a member having an internal thread coacting therewith for adjusting the same longitudinally on the tube so as to cause it to bear upon the end of a glass tube held in alignment with the first mentioned tube to prevent said tubes from telescoping, means for sealing the space between the member and tube, means for sealing the space between the member and glass tube, and means for draining gas from one end of the screw threads to the other when air is exhausted from the tubes.

2. In a vacuum connection of the class described, a tube having an external screw thread, a member having an internal thread coacting therewith for adjusting the same longitudinally on the tube so as to cause it to bear upon the end of a glass tube held in alignment with the first mentioned tube to prevent said tubes from telescoping, a rubber sheet closely surrounding each of the tubes and coated with a viscous liquid of low vapor pressure and lying closely adjacent a surface of the member to seal the space between the member and one of the tubes.

3. In a vacuum connection of the class described, two tubes substantially in alignment, a member partially enclosing one of said tubes, means associated with said member for positioning it with respect to both said tubes so as to fix the position of one tube with respect to the other, and rubber gasket means coated with a heavy viscous liquid of low vapor pressure for sealing the space between the member and the tubes.

WALTER A. CARLSON.